US011343851B2

(12) United States Patent
Fodor et al.

(10) Patent No.: US 11,343,851 B2
(45) Date of Patent: May 24, 2022

(54) METHOD AND APPARATUS FOR MANAGING CARRIER SENSING

(71) Applicant: Telefonaktiebolaget LM Ericsson (publ), Stockholm (SE)

(72) Inventors: Gabor Fodor, Hasselby (SE); Osama Al-Saadeh, Kista (SE); Chrysostomos Koutsimanis, Jersey City, NJ (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 315 days.

(21) Appl. No.: 16/613,947

(22) PCT Filed: May 16, 2017

(86) PCT No.: PCT/EP2017/061764
§ 371 (c)(1),
(2) Date: Nov. 15, 2019

(87) PCT Pub. No.: WO2018/210412
PCT Pub. Date: Nov. 22, 2018

(65) Prior Publication Data
US 2021/0410183 A1 Dec. 30, 2021

(51) Int. Cl.
*H04W 74/08* (2009.01)
*H04B 7/0452* (2017.01)
*H04B 7/06* (2006.01)

(52) U.S. Cl.
CPC ...... *H04W 74/0808* (2013.01); *H04B 7/0452* (2013.01); *H04B 7/0617* (2013.01)

(58) Field of Classification Search
CPC .......... H04B 7/06; H04B 7/08; H04B 7/0695; H04B 7/0626; H04W 74/08; H01Q 3/30; G01S 1/0428
See application file for complete search history.

(56) References Cited

U.S. PATENT DOCUMENTS

| 7,103,386 | B2 | 9/2006 | Hoffmann et al. |
| 9,119,110 | B2 | 8/2015 | Merlin et al. |
| 10,075,222 | B2* | 9/2018 | No ........................ H04B 7/0408 |
| 2005/0075142 | A1 | 4/2005 | Hoffmann et al. |
| 2011/0287796 | A1 | 11/2011 | Jain et al. |
| 2015/0208439 | A1 | 7/2015 | Cheong et al. |

(Continued)

FOREIGN PATENT DOCUMENTS

WO 2014179575 A2 11/2014

OTHER PUBLICATIONS

PCT International Search Report, dated Feb. 2, 2018, in connection with International Application No. PCT/EP2017/061764, all pages.

(Continued)

*Primary Examiner* — Iqbal Zaidi
(74) *Attorney, Agent, or Firm* — Christopher & Weisberg, P.A.

(57) ABSTRACT

Methods and apparatus are proposed for managing carrier sensing in a communications system. In order to enable carrier sensing of a beamforming transmission to a served wireless device, a network node transmits a first transmission and a second transmission. The second transmission is the beamforming transmission to the served wireless device and the first transmission is an unhiding signal, which indicates the presence of the second transmission.

18 Claims, 10 Drawing Sheets

(56) References Cited

U.S. PATENT DOCUMENTS

2016/0301492 A1   10/2016  Wilhelmsson et al.
2018/0192432 A1*  7/2018  Tenny ............... H04W 72/1289
2019/0166503 A1*  5/2019  Ahn ..................... H04W 16/14

OTHER PUBLICATIONS

PCT Written Opinion, dated Feb. 2, 2018, in connection with International Application No. PCT/EP2017/061764, all pages.
European Communication dated Feb. 4, 2021 in connection with European Application No. 17724798.8, 8 pages.
Grabski, S., et al., "Steganography in OFDM Symbols of Fast IEEE 802.11n Networks", Security and Privacy Workshops (SPW), 2013 IEEE, May 23, 2013, pp. 158-164.

* cited by examiner

METHOD AND APPARATUS FOR MANAGING CARRIER SENSING

TECHNICAL FIELD

Embodiments herein relate generally to a wireless access point or base station and a method in the wireless access point or base station. More particularly the embodiments herein relate to radio communications, and in particular, to base station communications.

BACKGROUND

Deploying large number of antenna elements at wireless access points and cellular base stations enables directional communications by means of forming narrow beams. To direct the beam or multiple beams to the location of the intended receiver, the base station needs accurate Channel State Information at the Transmitter (CSIT), which is assisted by various uplink and downlink reference signals and feedback mechanisms.

Due to CSIT errors, and depending on the number of transmit antennas, hardware impairments, mobility, sudden changes in the propagation environment and other reasons, a small or large portion of the signal energy intended for a specific receiver may be directed to a non-intended (victim) receiver. For example, a side lobe of a directed beam may present interference to a receiving user equipment, which may result in symbol or bit errors and lower achieved user bitrates. A wireless device is a victim receiver if it is scheduled for downlink transmission but the victim receiver is in the vicinity of another, adjacent, wireless device, currently receiving a beamforming down link transmission. Interference will either prevent the victim receiver from receiving down link transmissions or significantly impair the downlink transmission whilst a down link beamforming transmission is being sent to the adjacent wireless device. The victim and adjacent wireless devices may be considered to be in the same interference zone.

A key mechanism enabling Licensed Assisted Access (LAA) and operation in unlicensed bands is carrier sensing or Listen-Before-Talk (LBT). LBT governs when a LAA cell may access the channel. For example, according to European Telecommunications Standards Institute (ETSI) EN 300 328 Carrier Sensing (CS)—and the so called Clear Channel Assessment (CCA)—must be performed prior to starting a new transmission. An extended CS is performed if the channel is determined to be occupied during the CS period and transmission is postponed until the channel is considered clear.

A well-known problem in LBT and CS systems is the hidden node problem, in which a transmitter does not sense the medium to be busy, although there is an ongoing transmission which may cause interference at the intended receiver. The hidden node problem may be caused by the geometry of the transmitter performing carrier sensing, the transmitter causing interference and the intended receiver, degraded receiver sensitivity at the transmitter, shadowing or other reasons.

In US 2016/0301492 A1 a Base Station (BS) sends positioning signals to a plurality of User Equipment (UE)s. The UEs respond with positioning information. According to the UEs positions the BS arranges the UEs into one or more groups, and allocates respective frequency resources to each group. Eventually the UE location determines what set of frequencies it can select to communicate with the BS.

In U.S. Pat. No. 7,103,386 B2 a method is disclosed wherein, based on signal quality metrics available from the physical layer upon receiving a signal from UEs, a BS selects the best or preferred directional antenna pattern. Using the preferred direction for each UE to detect a possible hidden node problem. For UEs with possible hidden node problem they should perform Request to send (RTS) and Clear To Send (CTS) operations.

In US 2015/0208439 A1 a BS is disclosed wherein the BS comprises a sector antenna in a wireless local access network and per-schedule sector intervals to sequentially perform transmission and reception of data. By applying sectorization, the system becomes robust against the hidden node problem.

In U.S. Pat. No. 9,119,110 B2 a BS and a UE exchange information about the available channels for transmission or reception, implicitly, or explicitly. One device sends RTS on all the possible channels for the device to transmit on, the other device responds with CTS only on the available channels for reception.

In highly direction beamforming systems and particularly heterogeneous networks it is desirable to have an efficient and dynamic solution to avoid the hidden node problem.

SUMMARY

In an embodiment a method in a network node for managing carrier sensing in a communications network is provided. The communications network comprising a plurality of network nodes, the method comprising: transmitting a first transmission and transmitting a second transmission wherein the second transmission is a beamforming transmission to a served wireless device and the first transmission is an unhiding signal which indicates the presence of the second transmission. This provides the advantage that a neighbour node intending to transmit to another wireless device can sense the transmission of the unhiding signal on the carrier when the network node is transmitting a beamforming transmission.

The first transmission may comprise a broad beam or a sweeping beamforming transmission, detectable by one or more neighbour nodes or a directional beamforming transmission, directed to a certain neighbour node.

In some examples the first transmission is concurrent with the second transmission.

In other examples the first transmission comprises information relating to the second transmission to assist the neighbour node perform a carrier sensing operation. In some instances the information provides location based information of one or more served wireless devices to the neighbour node and wherein the first transmission provides further information related to the served wireless device which receives the second transmission. The location based information may identify non-compatible sets of wireless devices, wherein a non-compatible wireless device is a wireless device not served by the neighbour node but which is located within an interference zone of another wireless device, served by the neighbour node. In some examples the location based information is provided by a backhaul network.

In other examples the first transmission comprises information indicating one or more of: an identity of a wireless device; a position of, or direction from the network node to, a wireless device; information about a plurality of wireless devices for a multi-user MIMO transmission; a time duration of the second beamforming transmission; and a frequency of the second beamforming transmission.

In a further embodiment a method in a network node is provided for managing carrier sensing in a communications network comprising a plurality of network nodes. The method comprising: receiving a first transmission from a neighbour node; performing a carrier sensing operation based on the received first transmission, wherein the first transmission indicates the presence of a second transmission and wherein the second transmission is a beamforming transmission; and performing a down-link transmission to a served wireless device, based on the carrier sensing operation. The network node benefits from the first transmission which unhides the second transmission and thereby enables the network node to determine that the carrier is busy. The network node defers transmission to its served wireless device until the carrier is sensed to be clear.

The method may further comprise determining the start of the second transmission based on the start of the first transmission and in some examples the first transmission and the second transmission occur concurrently.

In other examples the first transmission comprises information indicating one or more of: an identity of a wireless device; a position of, or direction from the network node to, a wireless device; information about a plurality of wireless devices for a multi-user MIMO transmission; a time duration of the second beamforming transmission; and a frequency of the second beamforming transmission.

In another embodiment, an apparatus for managing carrier sensing in a communications network is provided. The apparatus is configured to transmit a first transmission and configured to transmit a second transmission wherein the second transmission is a beamforming transmission to a served wireless device and the first transmission is an unhiding signal which indicates the presence of the second transmission. The apparatus provides the advantage that neighbour nodes which cannot detect the second transmission, because it is a beamforming transmission directed to a served wireless device, detect the unhiding beam and thereby sense the carrier to be occupied.

In another embodiment, an apparatus for managing carrier sensing in a communications network is provided. The apparatus is configured to: receive a first transmission from a neighbour node, perform a carrier sensing operation based on the received first transmission, wherein the first transmission indicates the presence of a second transmission and wherein the second transmission is a beamforming transmission, and perform a down-link transmission to a served wireless device, based on the carrier sensing operation. The apparatus senses the first transmission which unhides the second transmission. Thus the apparatus is able to sense the carrier is busy when it may not be able to detect the second transmission directly.

In another embodiment an apparatus for managing carrier sensing in a communications network is provided. The apparatus comprises a processor, a memory and a communication circuit, wherein the communication circuit is configured to transmit a first transmission and further configured to transmit a second transmission wherein the second transmission is a beamforming transmission to a served wireless device and the first transmission is an unhiding signal which indicates the presence of the second transmission.

In another embodiment an apparatus for managing carrier sensing in a communications network is provided. The apparatus comprises a processor, a memory and a communication circuit, wherein the communication circuit is configured to receive a first transmission from a neighbour node, perform a carrier sensing operation based on the received first transmission, wherein the first transmission indicates the presence of a second transmission and wherein the second transmission is a beamforming transmission and perform a down-link transmission to a served wireless device, based on the carrier sensing operation.

In another embodiment a computer program product or a carrier containing a computer program comprising instructions which, when executed on at least one processor, causes the at least one processor to carry out any of the methods described herein.

DETAILED DESCRIPTION

Figure 1:
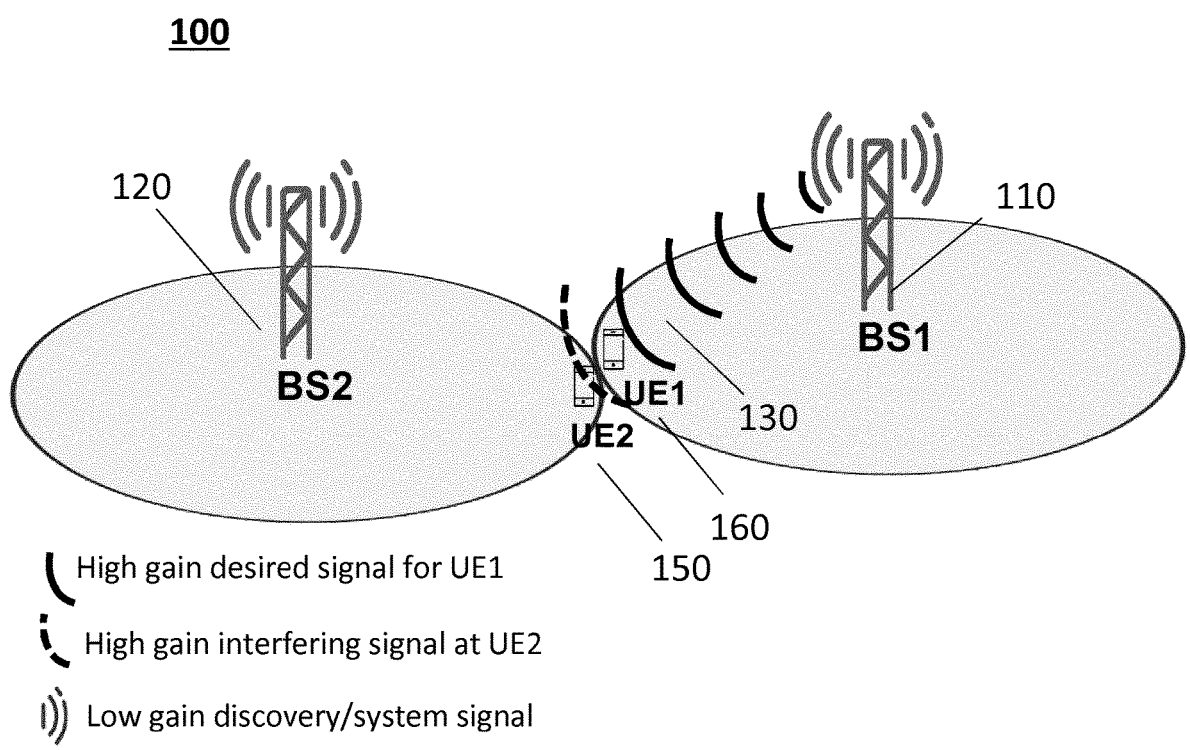
FIG. 1 is an example network environment according to embodiments of the present disclosure.

The embodiments disclosed herein apply to scenarios, in which Base Stations (BS) or wireless access points, collectively termed network nodes from here onwards, employ Listen-Before-Talk (LBT) as a distributed Medium Access Control (MAC) mechanism. A network node may be one of a plurality of network nodes in a communication system wherein one or more network nodes are adjacent to each other. A served wireless device of one network node may be in close proximity to served wireless devices of another network node. Such nodes are termed neighbouring nodes and from the perspective of any one network node, the other network nodes are termed neighbour nodes. A network node, which may be equipped with multiple transmit antennas, uses existing schemes to acquire Channel State Information at the Transmitter (CSIT) and uses beamforming to improve the Signal to Noise Ratio (SNR) at intended receivers and reduce the caused interference at non-intended (victim)

receivers. In one example scenario, a communication network 100 is depicted in FIG. 1. A network node 110 (BS1) is transmitting a highly directional beam 130 to its intended receiver 160 (UE1). That transmission causes interference at the victim receiver 150 (UE2), with a transmission from a neighbour node 120. With existing medium sensing, also known as carrier sensing, and associated MAC protocols due to the directional transmission by BS1 directed towards UE1, neighbour node 120 (BS2) cannot detect the network node 110 (BS1) transmission and suffers from the hidden node problem. This can happen even if the distance between neighbour node 120 (BS2) and network node 110 (BS1) is small (such as in dense deployment scenarios). The neighbour node 120 (BS2) senses the medium or carrier to be idle. If network node 110 (BS1) starts transmitting, it can degrade the Signal to Interference plus Noise Ratio (SINR) at UE2 150, while UE1 160 will be subject to interference caused by neighbour node 120 (BS2) when BS2 starts its transmission. In FIG. 1, UE 1 160 and UE2 150 are in close proximity, and therefore may be subject to interference if they are both receiving down link transmissions simultaneously. Network node 110 (BS1) is hidden from neighbour node 120 (BS2) due to its highly directional communication towards its intended receiver 160 (UE1). Due to the hidden node problem, neighbour node 120 (BS2) starts transmitting to UE2, 150, sensing the medium is idle when in fact it is not.

In one embodiment, a method in a network node for managing carrier sensing in a communications network, comprising a plurality of network nodes is disclosed. The method comprises transmitting a first transmission, and a second transmission wherein the second transmission is a beamforming transmission and the first transmission is an unhiding signal which indicates the presence of the second transmission.

A beamforming transmission corresponds to a directional transmission produced through the use of multi-antenna technologies, thereby producing a transmission in the form of a beam. The resulting transmission may be described as 'beamformed'.

An unhiding signal is a transmission from one network node to one or more other network nodes to indicate the transmission or intended transmission to a served wireless device. In its most basic form, the unhiding signal may be an energy transmission only, i.e. not containing any additional information decodable by other network nodes. The first transmission is an unhiding signal sent from the network node to one or more neighbour nodes, wherein the unhiding signal indicates the presence of the second transmission.

The unhiding signal or beam is used by a neighbour node for energy detection to sense the transmission medium is busy. Thus, if the first transmission is detected by a neighbour node whilst the network node is transmitting or about to transmit a second transmission (which might not itself be detectable by the neighbour node) the first transmission is used to inform the neighbour node of the presence of the second transmission.

The second transmission is a beamforming transmission of control or data directed to a specific wireless device, e.g. UE 1, which may cause interference with other downlink transmissions to other wireless devices in the vicinity of UE1, if a neighbour node initiated such a transmission. In some examples the second transmission is a highly direction beamforming transmission. A data transmission is any type of transmission which conveys payload information to the intended user. In a $3^{rd}$ Generation Partnership Project (3GPP) Long Term Evolution (LTE) based system, for example, a data transmission corresponds to the transmission of the Physical Downlink Shared Channel (PDSCH) and Physical Uplink Shared Channel (PUSCH) channels in down link and uplink respectively. A control signal is a signal that conveys control or system information from higher layers or any other reference signal (RS). In an LTE-based system, a control signal transmission corresponds to the transmission of the Physical Downlink Control Channel (PDCCH) and Physical Uplink Control Channel (PUCCH) channels in down link and uplink respectively. Moreover, in 3GPP Rel. 13 and beyond as well as in early 5G or New Radio (NR) systems beamformed reference signals are introduced such as the Beam Measurement Reference Signal (BMRS) used for beam tracking and beam management.

The network node may be a $3^{rd}$ Generation Partnership Project (3GPP) base station according to any Radio Access Type (RAT) technology which supports beamforming transmissions such that the aforementioned hidden node problem arises. For example, but not limited to, Wideband Code Division Multiple Access (WCDMA), Long Term Evolution (LTE), New Radio (NR). The network node may alternatively or in addition support another RAT technology standardized by another forum than 3GPP, for example a wireless access point supporting a variant of WLAN or WiFi protocol, e.g. IEEE 802.x, which supports beamforming transmissions such that the aforementioned hidden node problem arises.

Neighbour nodes may be any RAT technology, such as those described above, which are required to perform carrier sensing prior to performing a down link transmission. Neighbour nodes may be within the same customer network as the network node or they may be neighbour network nodes, in other words the neighbour node which performs the carrier sensing operation belongs to a different network than the network node which is transmitting the beamforming transmission.

In some examples one network uses broad-beam based transmissions while another, adjacent, network uses narrow-beam based transmissions. The two networks apart from different capabilities in transmitting data and/or control signals, can differ in the used access technology. As an example, one network can be non-slot based (such as a WiFi network) while the other, adjacent, network can be slot based (such as an LAA network, where wireless devices are scheduled in well-defined time slots or TTIs).

The network nodes and neighbour nodes may comprise LBT based MAC protocols to perform scheduling and transmissions of control signaling and/or data.

By transmitting a first transmission prior to transmitting the second, beamforming transmission, the hidden node problem is mitigated or may be eliminated completely in networks using directional communications. The advantage is reduced packet collision and improved spectrum efficiency. The number of retransmissions are reduced and thereby reducing the packet delay, especially in high load situations, in which packet collisions due to the hidden node problem would be frequent.

Figure 2A:
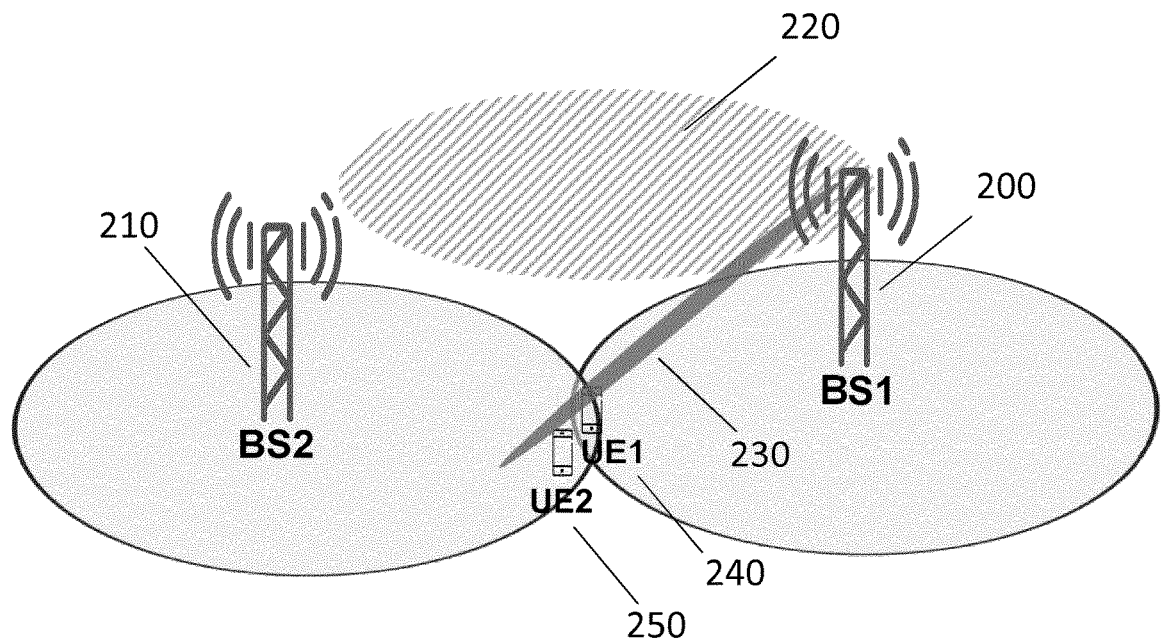
FIGS. 2a and 2b illustrate example embodiments of the present disclosure.
Figure 2B:
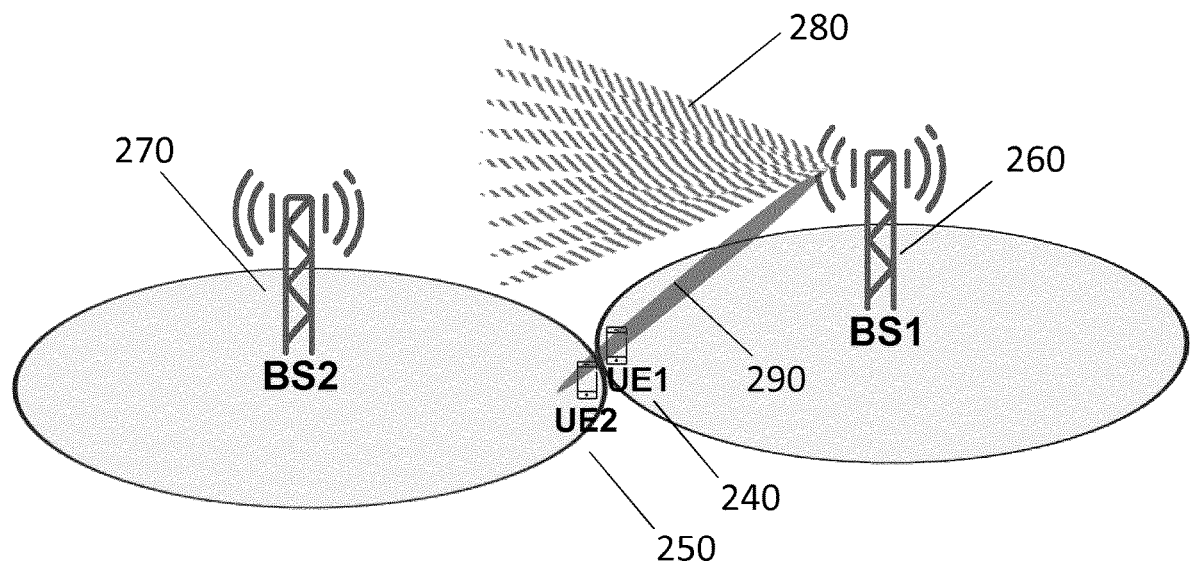

In a further embodiment, as depicted in FIG. 2a, a first transmission 220 comprises a single broad beam, transmitted from a network node 200. The first transmission 220 may be detected by one or more neighbour nodes 210. A second transmission 230 is a beamforming transmission directed to a served wireless device 240 which may cause interference to another wireless device 250 served by the neighbour node 210. As a result of detecting the first transmission 220 the neighbour node defers any transmissions to wireless device 250. In another embodiment, as depicted in FIG. 2b, a first transmission 280 comprises one or more sweeping beams, transmitted from a network node 260. The network node transmits a second transmission 290, which is a beamforming transmission directed to a served wireless device 240 which may cause interference to another wireless device 250 served by the neighbour node 270. The first transmission 280 may be detected by one or more neighbour node 270, and as a result the neighbour node defers any transmissions to its served wireless device 250. A sweeping beam may be generated using multiple antenna techniques.

In another embodiment the first transmission comprises a multiple antenna beam which is directional towards one or more known neighbour node. The beam may be energy based only, as previously described, or may further comprise information about a pending down link beamforming transmission.

In some examples there are multiple neighbour nodes to be notified, for example if it is known that multiple wireless devices are in the vicinity of the wireless device scheduled to receive the second, beamforming transmission. Another example is in the case of Multi-User Multiple Input Multiple Output (MU MIMO) scheduling, where multiple wireless devices are scheduled to receive the second, beamforming, transmission and one or more of those wireless devices could be in the vicinity of a potential victim wireless device, served by a neighbour node. In such cases the network node may need to unhide itself to multiple neighbour nodes. In some examples the network node uses an omnidirectional or broad, beam based, unhiding signal (on a specific preconfigured frequency). This can be done with or without encoded information, as described above.

In order that the network node can direct the beam to the known one or more neighbour nodes, the transmitting network node will have obtained appropriate channel state information providing an estimate of the channel to the one or more neighbour nodes. The knowledge of the channel can vary from a detailed knowledge of the channel in time and frequency domains to a coarser estimation of the second order statistics. Correspondingly, the neighbour node uses a preconfigured set of receive weights (receive beamforming) to detect the unhiding signal; the first transmission wherein the transmission is a beamforming transmission.

A further advantage is achieved in networks where only second order statistics of the channels of neighbour wireless devices and/or network nodes are available. The proposed embodiments do not require explicit channel knowledge which can be resource consuming.

The method capitalises on second order statistics of the channel, such as the Angle Of Arrival (AOA) of the strongest path. The second order statistics of a channel can be estimated using a much coarser (that is in time and frequency) channel estimation process. Second order statistics are obtained by analysing a channel covariance matrix at the receiver and provide estimation on the spread of dominant paths in the angular domain. This information can be further utilized to assess position of (in a Line-Of-Sight (LOS) environment) or strong path direction to (in a Non-Line-Of-Sight (NLOS) environment with multiple multipath components) the neighbour node. This has the advantage of reducing the number of beams transmitted/transmission energy for the unhiding signal.

The channel estimation between neighbour nodes is based on transmission of reference signals that can be decoded by a receiving neighbour node. In an asynchronous Time Division Duplex (TDD) system, a network node can receive down link reference signals transmitted by a neighbour node and utilize them to assess the channel or its second order statistics to the neighbour node. In a synchronized Frequency Division Duplex (FDD) or TDD system, there is a need for an inter-node channel estimation phase where a network node transmits reference signals and the neighbour nodes are configured to receive them and estimate the channel. This process does not need to be performed frequently since the position of the network node/neighbour node is static. In another example, this process could be part of a self-optimizing (SON) algorithm that maintains neighbour cells list and optimizes system information transmissions, such as an automatic Physical Cell Identity (PCI) planning in an LTE based system.

Coordination or information exchange between neighbour nodes can be used to assist the channel estimation. Each network node communicates to its neighbour via a backhaul link. The capabilities of the backhaul link can define different stages of communication in terms of amount and frequency of exchanged data information. For example, the network node might utilize a high capacity backhaul link (based on the Common Public Radio Interface, CPRI) that allows coordination and information exchange on the time slot level. This could be the case of communication between Remote Radio Heads (RRH) of a single operator. In another example, the network node could utilize a slower but still fast enough backhaul that allows coordination in the time scale of several time slots. Such an example could be the standardized X2 interface in a 3GPP LTE network, which allows fast communication between neighbour nodes. In yet another example, the network node utilizes slower time scale coordination through the transport network or higher layer protocol. This could be the case when coordination occurs between neighbour nodes of different operators or communication between different systems, or RAT technologies, such as a WiFi and LAA systems.

In any of the above described embodiments the timing of the transmission of an energy beam or unhiding signal, be it a single broad beam, sweeping beam or directional beam, can be used to indicate when the second transmission is occurring.

In some examples the first transmission occurs concurrently with the second transmission. The network node starts transmitting the unhiding beam towards the neighbour node at the time it starts transmitting the second, beamforming, transmission towards the served wireless device. From the perspective of the neighbour node, detecting the first transmission is similar to the regular operation of carrier sensing, since the energy detection of the unhiding beam and the actual data transmission, the second transmission, happens at the same time. The neighbour node performing LBT will wait until the carrier is idle before transmitting to its served wireless device. The advantage of this solution is that the unhiding beam is transmitted only for the duration of the actual data transmission.

Figure 3:
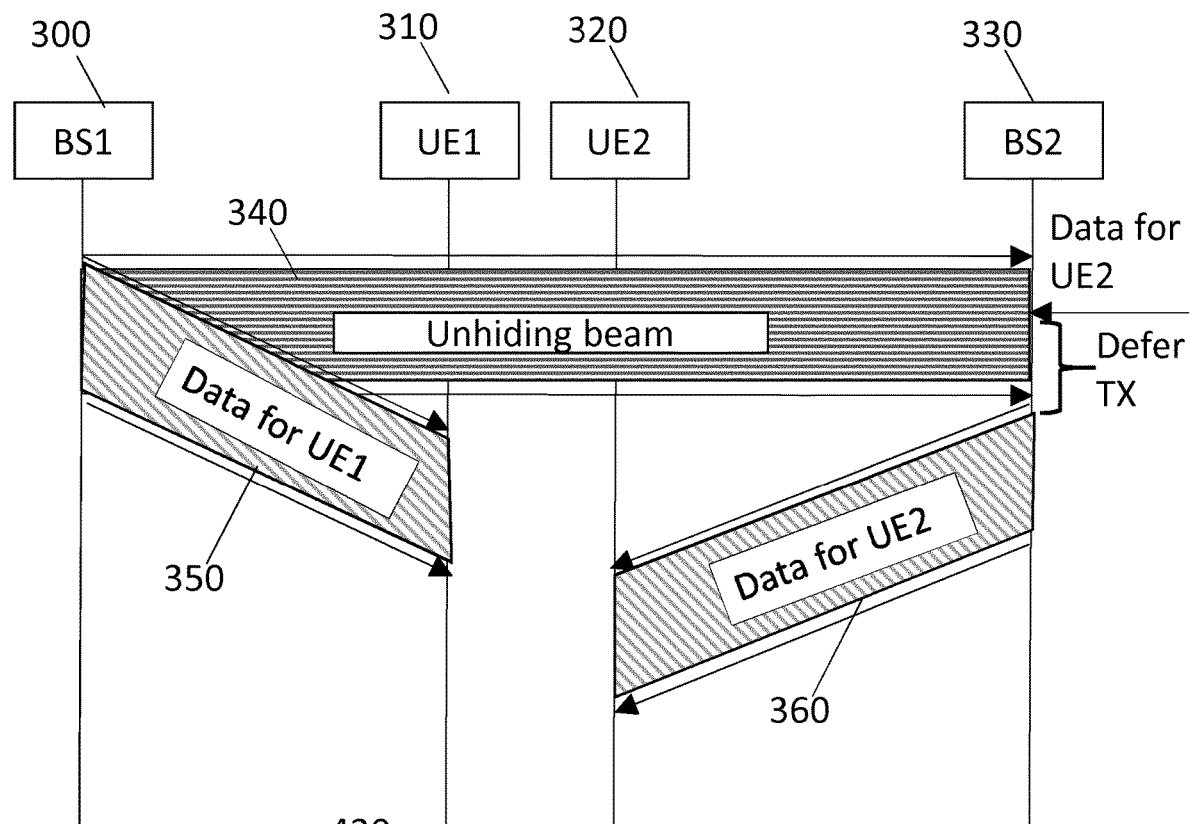
FIG. 3 is an example sequence according to an embodiment of the present disclosure.

FIG. 3 provides further description of the above described example, wherein the network node 300 (BS1) transmits a first transmission 340, unhiding beam, concurrently with a second transmission 350. The first transmission 340 comprises data for a served wireless device 310 (UE1). During the transmission of the unhiding beam 340, a neighbour node 330 determines that it has data to send to a served wireless device 320 (UE2). The neighbour node 330 performs LBT and detects the unhiding signal 340 from the network node 300 (BS1) and defers its down link transmission 360 until the unhiding signal 340 has ceased, i.e. the channel is determined to be idle.

In another example the unhiding beam is sent by the network node prior to the actual data transmission, the likelihood that a neighbour node can detect the energy in the medium in time is higher as compared to the method wherein the unhiding beam is sent concurrently for the duration of the second transmission. This can be important in heavy load situations, in which the transmissions from the network node and intended transmissions from the neighbour node may be close in time. The time gap between transmitting the first transmission (the unhiding beam) and the second transmission can be preconfigured to some suitable value, in the order of several milliseconds corresponding to several subframes.

In a further example, the first transmission indicates that the network node will start using the channel. When the network node finishes transmitting the second transmission to its served wireless device, the network node sends a third transmission which indicates that the network node has finished using the channel. This third transmission may be termed a channel clearance. In some examples the network node transmits the first transmission beam towards the neighbour node using only one polarization and transmitting the third transmission beam towards the neighbour node on the orthogonal polarization. With this mechanism, the network node does not have to transmit the beam continuously to the neighbour node resulting in more efficient use of resources. The encoding of this single bit of information, for example using the polarization angles, is preconfigured among the network node and neighbour nodes within a set of cooperating neighbour nodes.

In other embodiments the first transmission is used to encode information about forthcoming or ongoing transmissions. This information assists neighbour nodes in determining appropriate actions when intending to access the medium, including refraining from transmission, selecting frequency resources (channels) or adapting other transmission parameters for a transmission to a wireless device in the vicinity of the wireless device which is receiving the second transmission.

The encoded information may comprise:
Identity of the served wireless device;
Angle of the served wireless device with respect to the network node in a predefined coordinate system or other location information of the served wireless device;
In case of multiple served wireless devices (MU MIMO), information about the multiple served wireless devices;
Expected time duration the channel will be used;
Which frequency channels will be used by the network node.

The encoded information in the unhiding beam allows the neighbour node to make appropriate carrier sensing decisions based on the presence of the unhiding beam and the decoded information in the unhiding beam. For example, in the case of position information (angle) of the served wireless device, the neighbour node can determine which of its served wireless devices are in the vicinity of the wireless device to which the unhiding beam relates and thereby only schedule wireless devices from among its served wireless devices which are not in the vicinity of the identified wireless device.

In another embodiment the network node maintains a set of users, for example, that are located in specific angular domains of their served cells or sectors. In some examples wireless devices are grouped in angular regions of a certain resolution, for example 10 degrees. By exchanging location related information of wireless devices between neighbouring nodes each network node can create a database of incompatible wireless devices.

In some examples a database comprises active (connected) wireless devices grouped into compatible and incompatible sets of wireless devices. Wireless Device A is incompatible with Wireless Device B if they are served by different network nodes (as an example, Base Station A and Base Station B respectively), and a transmission to Wireless Device A by its respective serving network node Base Station A causes interference to Wireless Device B if Wireless Device is scheduled for reception by its serving network node Base Station B. If Wireless Device A is incompatible with Wireless Device B, then in some examples Wireless Device B is incompatible with Wireless Device A. In other examples this reciprocal relationship does not hold. For example Wireless Device A is equipped with multiple receive antennas and is capable of directional reception of the intended signal transmitted by Base Station A, whereas Wireless Device B is a single receive antenna device. In this case, Wireless Device A is able to reject interference from Base Station B, but Wireless Device B is not capable of rejecting interference from Base Station A. When Wireless Device A is incompatible with Wireless Device B and when Wireless Device B is incompatible with Wireless Device A, Wireless Device A and Wireless Device B should not be scheduled for reception at the same time. More than two devices can be incompatible, if at least two devices within that set are incompatible.

An incompatible set of wireless devices thus corresponds to a collection of wireless devices that are in close proximity of each other but which are not served by the same network node and/or are not in the same cell as the other wireless devices. The concurrent transmissions by their respective serving network nodes cannot be spatially resolved and distinguished by the wireless devices and, therefore, cause interference to the reception by the wireless devices.

The wireless devices that are incompatible may be considered to be within the same interference zone. Incompatibility thus refers to the situation in which the wireless devices should not be scheduled for concurrent reception. Compatible wireless devices can be scheduled for the concurrent reception of signals transmitted by their respective serving network nodes.

Figure 4:
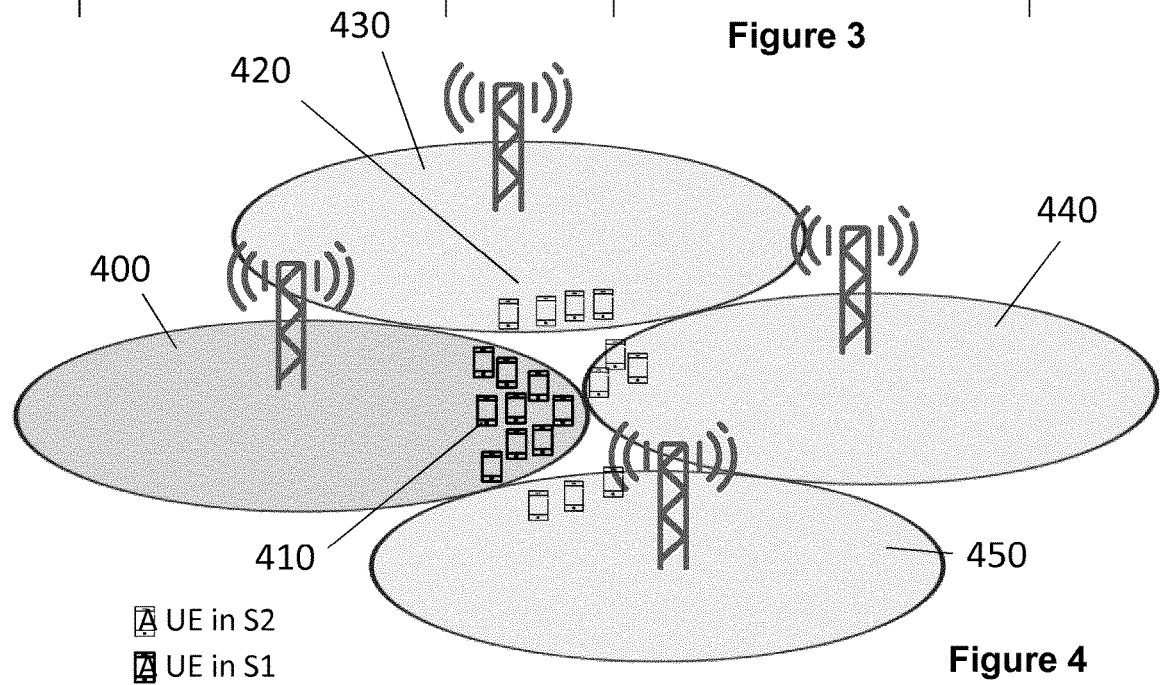
FIG. 4 illustrates an example network environment according to embodiments of the present disclosure.

The two different sets, e.g. S1, and S2 are depicted in FIG. 4 and can be further explained as:
S1 410 is the set of wireless devices connected to a reference cell 400 (intra-cell wireless devices), that have similar intra-cell spatial signature. Similar intra-cell spatial signature among wireless devices corresponds to the case where the angular spread of wireless devices in the horizontal and vertical domain is within a first threshold and their path loss from their serving network node is within a second threshold. In some examples the first threshold could correspond to the Half Power Beam Width (HPBW) of the antenna array of the BS and the second threshold is predetermined path loss interval, for example [40 dB<path loss<45 dB]. In another example, where a Grid of Beams (GoB) beamforming technique is used, wireless devices that report the same beam number are considered to have similar intra-cell spatial signature irrespective of their measured path loss value.
S2 420 is the set of wireless devices connected to one or more neighbour cell 430, 440, 450 (inter-cell wireless devices), that have the same or similar inter-cell spatial signature as the wireless devices in the set S1 410. Inter-cell spatial signature, with respect to the network node, refers to wireless devices with similar spatial signature as S1 410 but which are in neighbour cells 430, 440, 450. The inter-cell spatial signature can be estimated using reciprocity based channel estimation method in a TDD system or by utilizing mobility measurements in an FDD system.

Figure 5:
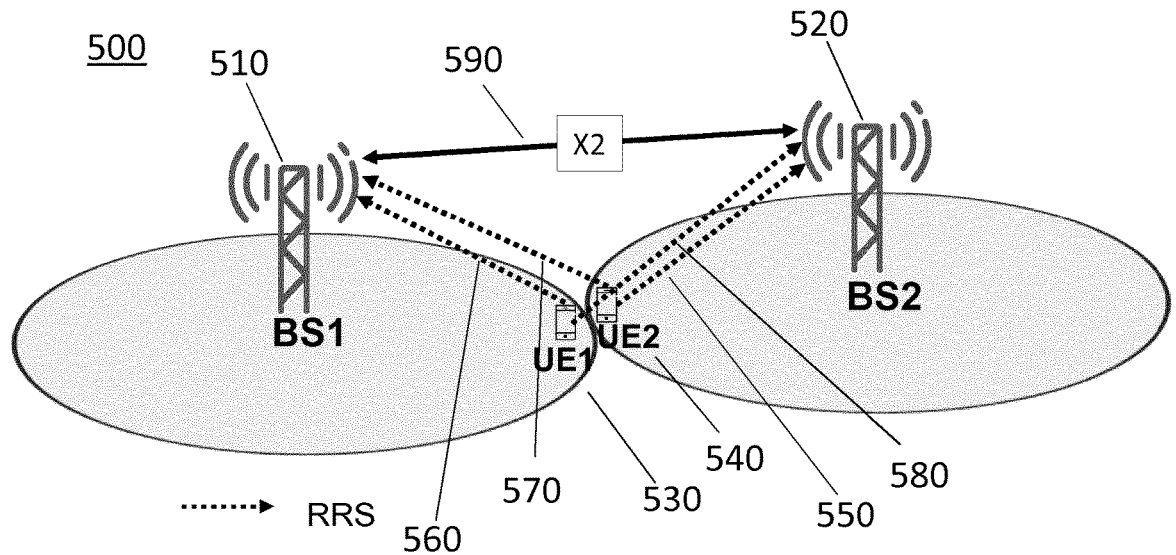
FIG. 5 illustrates an example network environment according to embodiments of the present disclosure.

FIG. 5 depicts an example communications network 500 wherein network nodes 510, 520 exchange information related to served wireless devices 530, 540. For example, over an X2 interface 590. In TDD systems, the network nodes can use reciprocity reference signals (RRS) 550, 560 transmitted by served wireless devices 530, 540 to acquire a CSIT. The RRS can also be used by the receiving network node 510, 520 to estimate the angle of arrival (AoA) of served wireless devices 530, 540. This AoA estimation is used to maintain the above mentioned incompatible wireless device database associating wireless devices to specific cell regions. In some examples a network node 510, 520 can capture the RRS 570, 580 (respectively) of non-served wireless devices 540, 530 (respectively) in addition to the RRSs 560, 550 (respectively) of its served wireless devices 530, 540 (respectively). Capturing non-served wireless devices' RRSs allows the network node to create and maintain the set of compatible and incompatible wireless devices without frequent signalling between neighbour nodes.

In FDD systems, network nodes cannot assume channel reciprocity to acquire CSIT. Therefore, in FDD systems, wireless devices in a handover zone (i.e. wireless devices which receive multiple down link reference signals above a predefined threshold value for some time duration), report either full or quantized channel state information and/or position information to the network node from which such reference signals are received. This report is used by the receiving network node to create and maintain the incompatible set of wireless devices.

Figure 6:
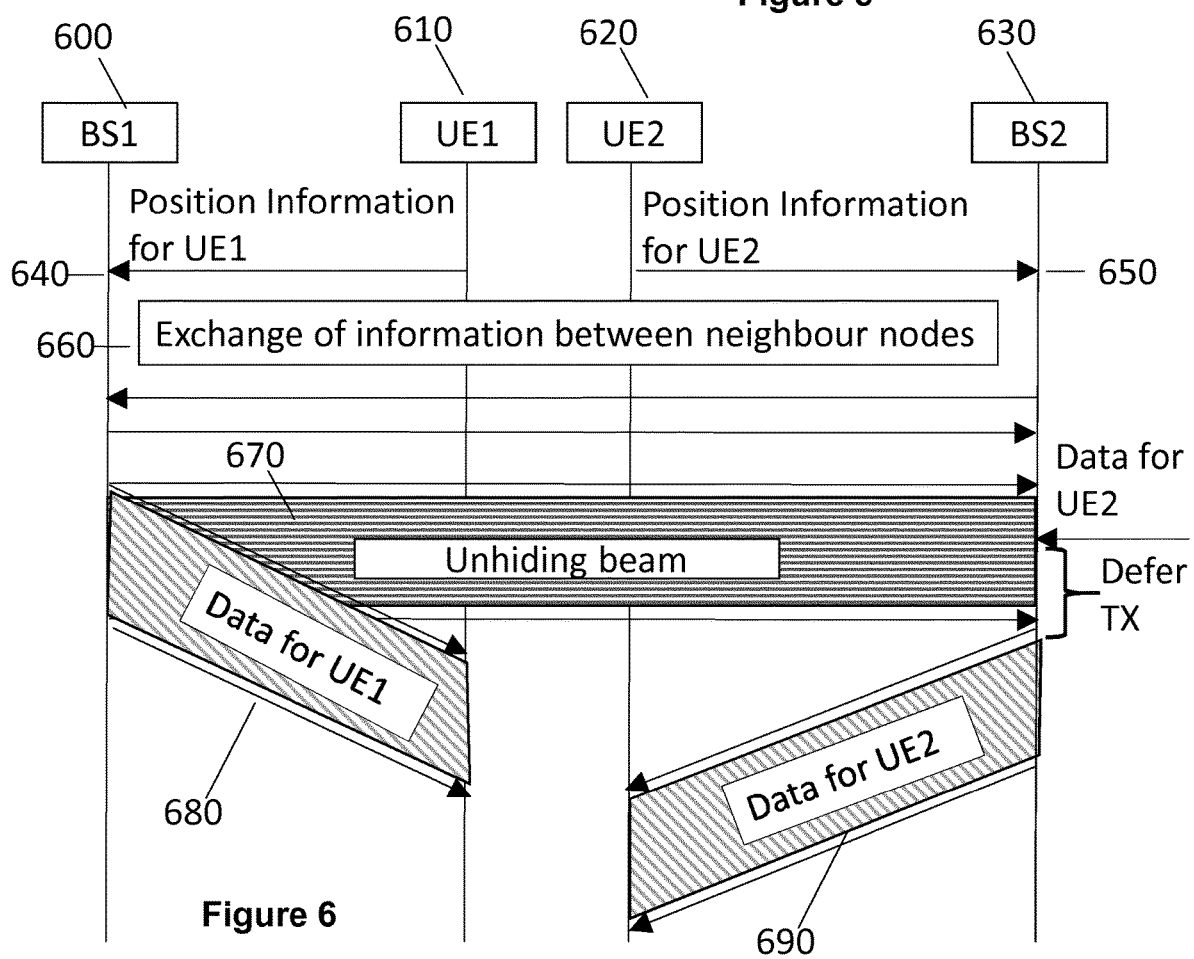
FIG. 6 is an example sequence according to an embodiment of the present disclosure.

In some examples the sets of incompatible wireless devices are determined and exchanged between network nodes. This embodiment is further described in FIG. 6. Wireless devices 610, 620 report positioning information 630, 640 to their served network nodes 600, 630. Periodically, the network nodes 600, 630 exchange information 660. For example, the exchange of the list of incompatible wireless devices. The network nodes can use low frequency (in the order of 100 ms or more) inter-base station signaling, for example over an X2 interface 590 or using BS-to-BS information exchange using similarly beamformed signals as the unhiding signal.

If a wireless device identified by encoded information in the first transmission, unhiding signal, is a member of the incompatible set of wireless devices with respect to a wireless device to which the neighbour node needs to schedule a transmission then the neighbour node defers the transmission until the carrier is determined to be clear. The carrier may be determined to be clear by any of the previously disclosed embodiments.

In a further example of the above disclosed embodiment, the network node 600 uses the exchanged information 660 from neighbour nodes to determine that one or more wireless devices 620 in an incompatible set would be a potential victim of interference due to its planned transmission 680 to a wireless device 610 served by the network node 600. The network node transmits a first transmission 670, an unhiding beam, as a directional beamforming transmission towards the neighbour node 630 but not to other neighbour nodes (which do not have wireless devices in an incompatible set, with respect to the wireless device to be scheduled). This way the number of unhiding beam transmissions can be limited. Correspondingly, the neighbour node 630 uses a preconfigured set of receive weights (receive beamforming) to detect the unhiding signal 670, the first transmission. The neighbour node 630 defers a transmission 690 to its served wireless device 620 while it determines the carrier is busy, based on the received unhiding signal 670.

In a further embodiment each network node exchanges intra-cell and inter-cell spatial signature and/or location information, and a network node determines dynamically whether or not incompatible wireless devices exist. Two wireless devices are considered incompatible if they have similar inter-cell spatial signature or if they have different intra-cell signature but their locations are within a threshold. In another example, a neighbour node detects an unhiding signal with encoded wireless device identity and checks this against exchanged information from the network node which has transmitted the unhiding signal. Using a threshold parameter for determining the proximity of the identified adjacent wireless device to the potential victim wireless device, the neighbour node determines if the adjacent wireless device is incompatible with the planned transmission. If so determined, then the neighbour node defers the transmission until the carrier is determined to be clear. The carrier may be determined to be clear by any of the previously disclosed embodiments.

In another example the network node uses the exchanged information to determine which neighbour node it should direct the first transmission to. The first transmission is a beam forming transmission to one or more neighbour nodes. For example, using a threshold parameter for determining the proximity of the served wireless device to the location information of wireless devices exchanged by a neighbour node. If the network node determines the served wireless device is incompatible with a neighbour node's wireless device it directs the unhiding beam to that neighbour node.

The above disclosed embodiments will now be further described with the aid of more specific figures.

Figure 7:
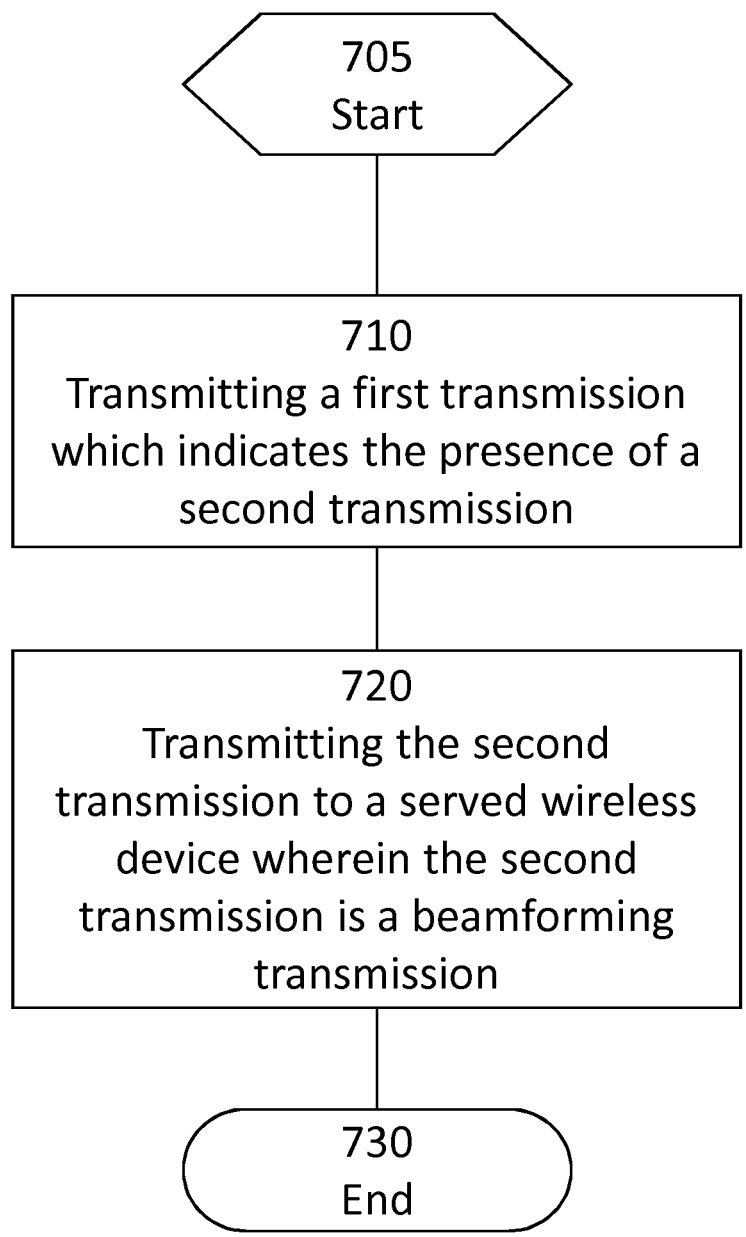
FIG. 7 is an example flow diagram according to an embodiment of the present disclosure.

In FIG. 7 a method, starting at 700, in a network node 200 is described, the method comprises transmitting 710 a first transmission wherein the first transmission indicates the presence of a second transmission. The first transmission can be an energy based transmission only and can be a broad beam transmission or a sweeping beam transmission. In other embodiments the first transmission can be a directional beamforming transmission and in some examples the first transmission can incorporate encoded information. The method proceeds with transmitting 720 the second transmission to a served wireless device, wherein the second transmission is a beamforming transmission. The first transmission indicates the presence of the second, beamforming transmission to neighbouring nodes. Such nodes may be obliged to perform carrier sensing operations (LBT) before transmitting but might not be able to detect the highly direction beamforming second transmission. The method in FIG. 7 ends at 730.

Figure 8:
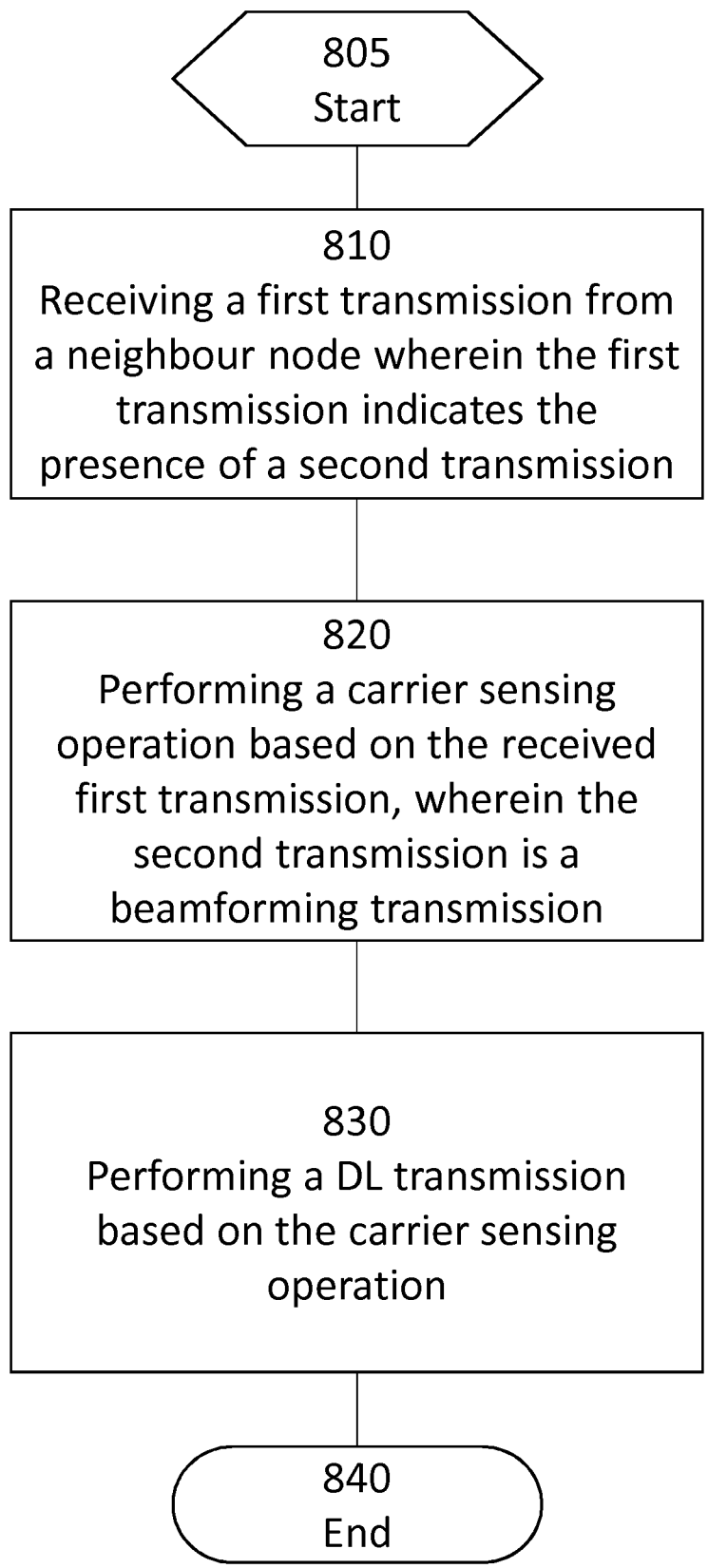
FIG. 8 is an example flow diagram according to an embodiment of the present disclosure.

FIG. 8 depicts a method, starting at 800, in a network node 210, 270, the method comprises receiving 810 a first transmission from a neighbour node wherein the transmission indicates the presence of a second transmission. The first transmission can be an energy based only transmission and can be a broad beam transmission or a sweeping beam transmission. In other embodiments the first transmission can be a directional beamforming transmission and in some examples the first transmission can incorporate encoded information.

The method proceeds with the network node performing 820 a carrier sensing operation based on the received first transmission. The carrier sensing operation can be in its simplest form detecting the first transmission as an energy based transmission which is concurrently transmitted with a second beamforming transmission. The first transmission thereby indicates the presence of the second transmission—the first transmission ceasing when the second transmission ceases. The second transmission is a beamforming transmission which might otherwise not be detectable by the network node. The carrier sensing operation in this case determines the carrier to be busy while the first transmission is detected and clear or idle when the first transmission ceases. In other embodiments the first transmission indicates the presence of a second transmission by indicating the start of the second transmission. In some examples the start of the second transmission is at a predefined period after the first transmission. In further examples a third transmission can be received to indicate the end of the second transmission. In other embodiments the second transmission is further indicated through encoded information. For example, the information may include the identity and/or location/position of the wireless device to which the second transmission is directed such that the network node may determine where the second, beamforming, transmission will occur. The carrier sensing operation in such a case involves not only determining when the second transmission is occurring but where it is occurring, e.g. in which direction, which frequencies, and/or for how long the transmission will occur.

The method proceeds with the network node performing 830 a down link transmission to a served wireless device based on the carrier sensing operation. The down link transmission is performed when the network node determines the carrier is clear from neighbour node transmissions. The method in FIG. 8 ends at step 840.

The embodiments disclosed herein may be implemented singly or in one or more combinations. An example of the combinations of the disclosed embodiments is provided in FIG. 9, which starts at 900. A network node 200, 260 which plans to schedule a highly directional beamforming transmission to a served wireless device determines 910 whether coordination or information exchange is supported between neighbour nodes. If such exchange of information between neighbour nodes is supported the network node determines the information to be exchanged. As described in detail above the information may comprise sets of incompatible wireless devices and/or position information of wireless devices. The network node exchanges said data 920 with neighbour nodes. The network node determines 930 whether neighbour node data is known for one or more neighbour nodes. For example channel data to enable multi-antenna transmissions directed to the neighbour node and or angular spread information to enable the network node to determine with which neighbour nodes it should communicate. If appropriate neighbour node data is available, the network node transmits a beamforming unhiding signal 940. The transmission can include encoded information which in combination with exchanged information at step 920 enables neighbour nodes to perform carrier sensing operation in relation to a second beamforming transmission from the network node. If no suitable neighbour node data exists to allow the network node to direct a beam to the neighbour node, the network node may provide an unhiding signal via the backhaul network signalling 950, e.g. via 3GPP X2 messaging.

Figure 9:
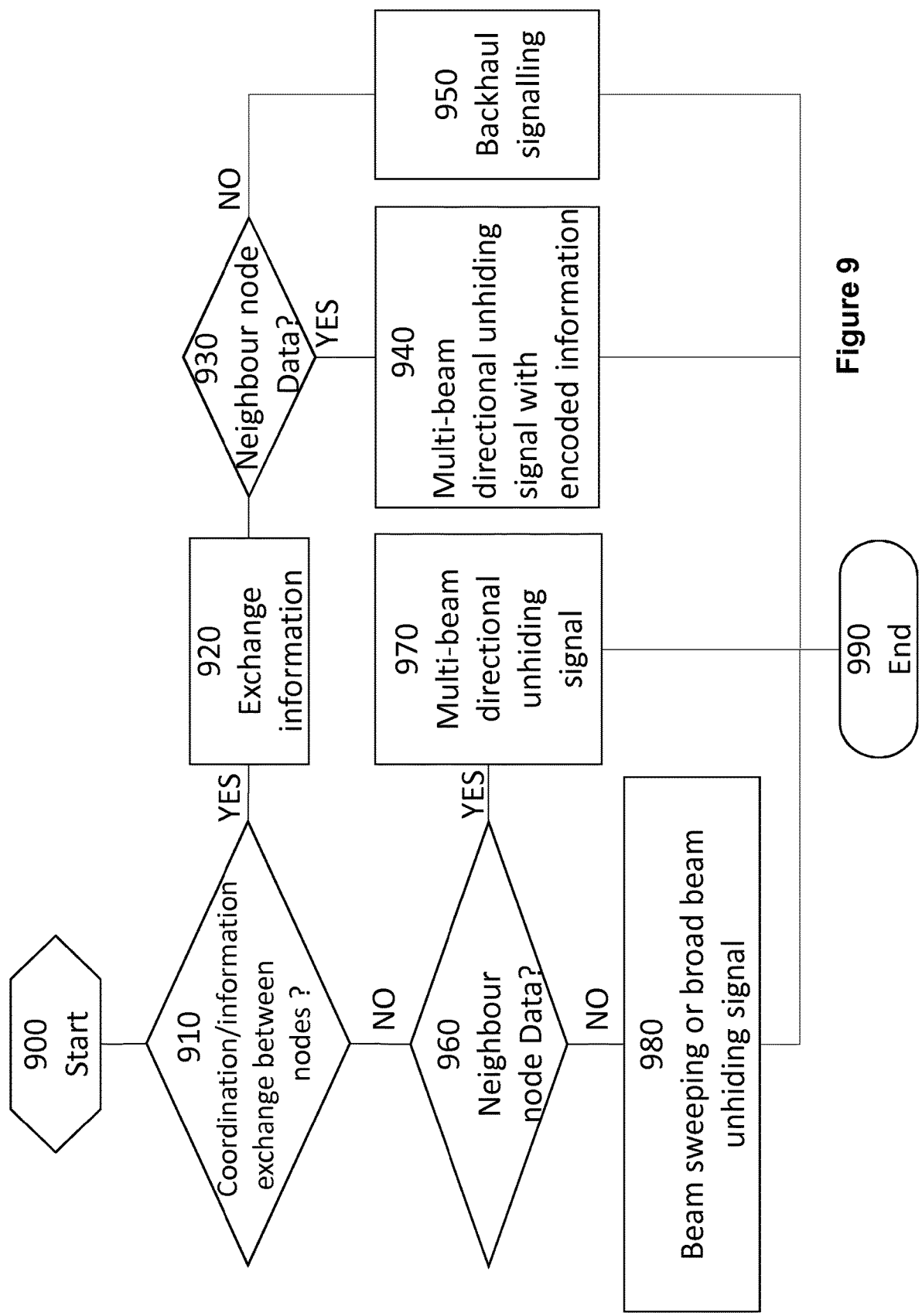
FIG. 9 is an example flow diagram according to an embodiment of the present disclosure.

In an alternate branch in FIG. 9, if no exchange of information between neighbour nodes exists, for example between different network operators or RAT technologies, the network node determines 960 whether neighbour node data exists. For example channel data to enable multi-antenna transmissions directed to the neighbour node and or angular spread information to enable the network node to determine with which neighbour nodes it should communicate. If appropriate neighbour node data is available, the network node transmits a beamforming unhiding signal 970. If at 960 the network node determines that no neighbour node data exists the network node transmits a single broad beam or sweeping beam of energy based unhiding signal 980.

In some examples the exchange of information may occur via radio transmissions, in which case step 930 may occur before step 920.

Figure 10:
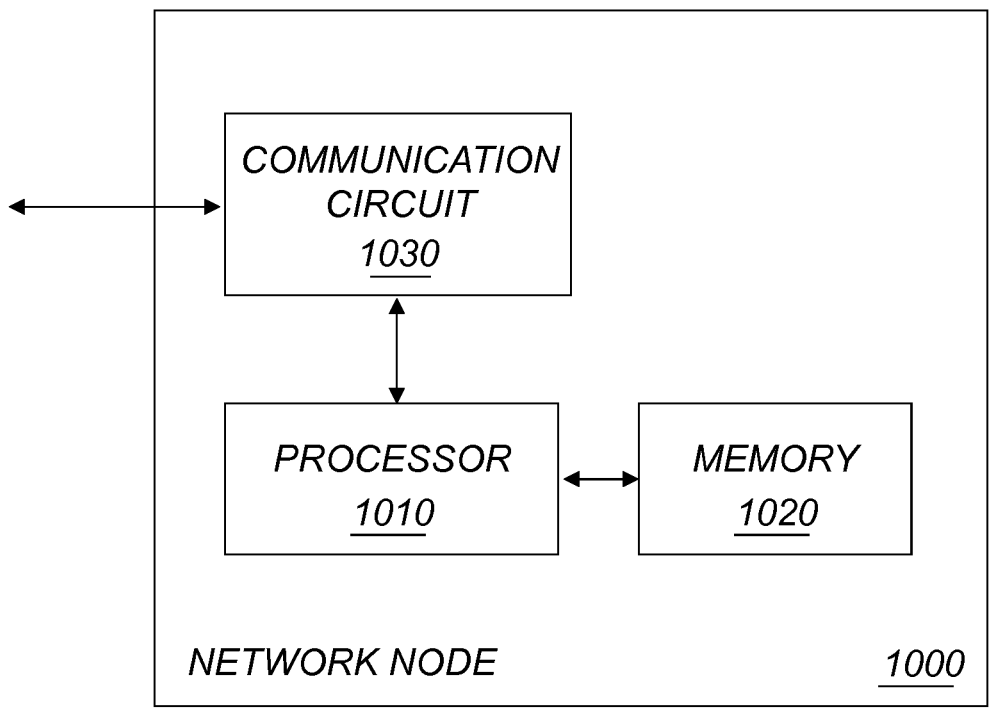
FIG. 10 is block diagram illustrating example physical units of processing circuitry of a network node useful for implementing the methods described herein, according to one or more embodiments of the present disclosure.

In FIG. 10 a network node 1000 comprises a processor or processing unit 1010 that controls the operation of the network node 1000. The processing unit 1010 is connected to a communication circuit 1030 which includes a transceiver or transceiver function. The communication circuit 1030 includes one or more antenna. The communication circuit 1030 is used to transmit signals to and receive signals from other network nodes (neighbour nodes) and wireless devices in the communications system. The network node 1000 also comprises a memory or memory unit 1020 that is connected to the processing unit 1010 and that contains instructions or computer code executable by the processing unit 1010 and other information or data required for the operation of the network node in accordance with the methods described herein.

Figure 11:
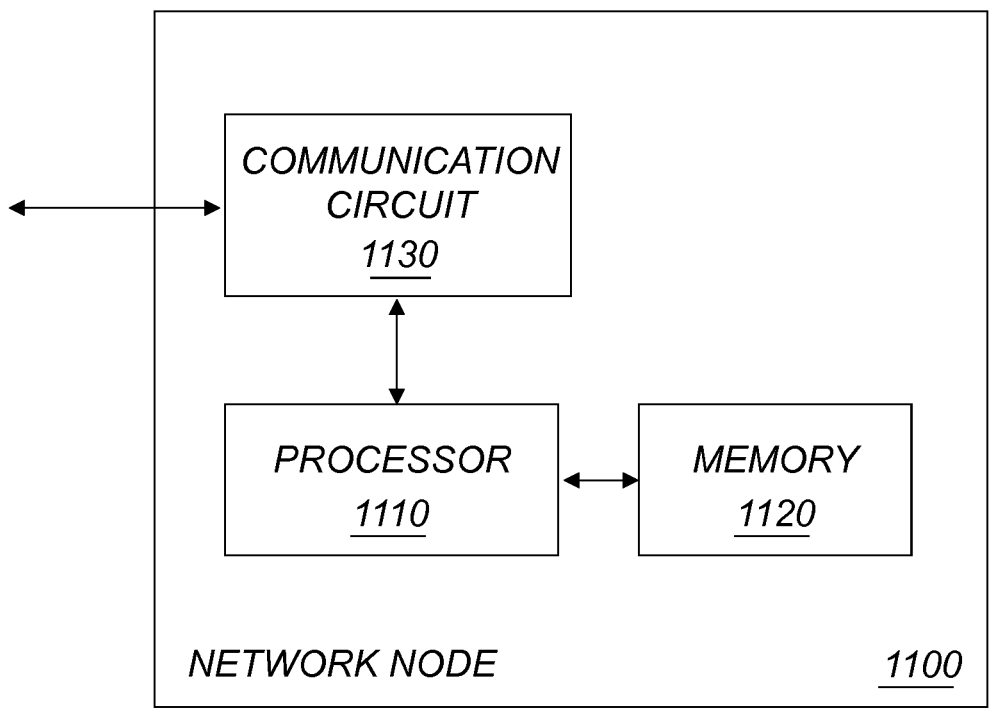
FIG. 11 is a block diagram illustrating example physical units of processing circuitry of a neighbour node useful for implementing the methods described herein, according to one or more embodiments of the present disclosure.

In FIG. 11 a neighbour node 1100 comprises a processor or processing unit 1110 that controls the operation of the network node 1100. The processing unit 1110 is connected to a communication circuit 1130 which includes a transceiver or transceiver function. The communication circuit 1130 includes one or more antennas. The communication circuit 1130 is used to transmit signals to and receive signals from other network nodes and wireless devices in the communications system. The network node 1100 also comprises a memory or memory unit 1120 that is connected to the processing unit 1110 and that contains instructions or computer code executable by the processing unit 1110 and other information or data required for the operation of the network node in accordance with the methods described herein.

Figure 12:
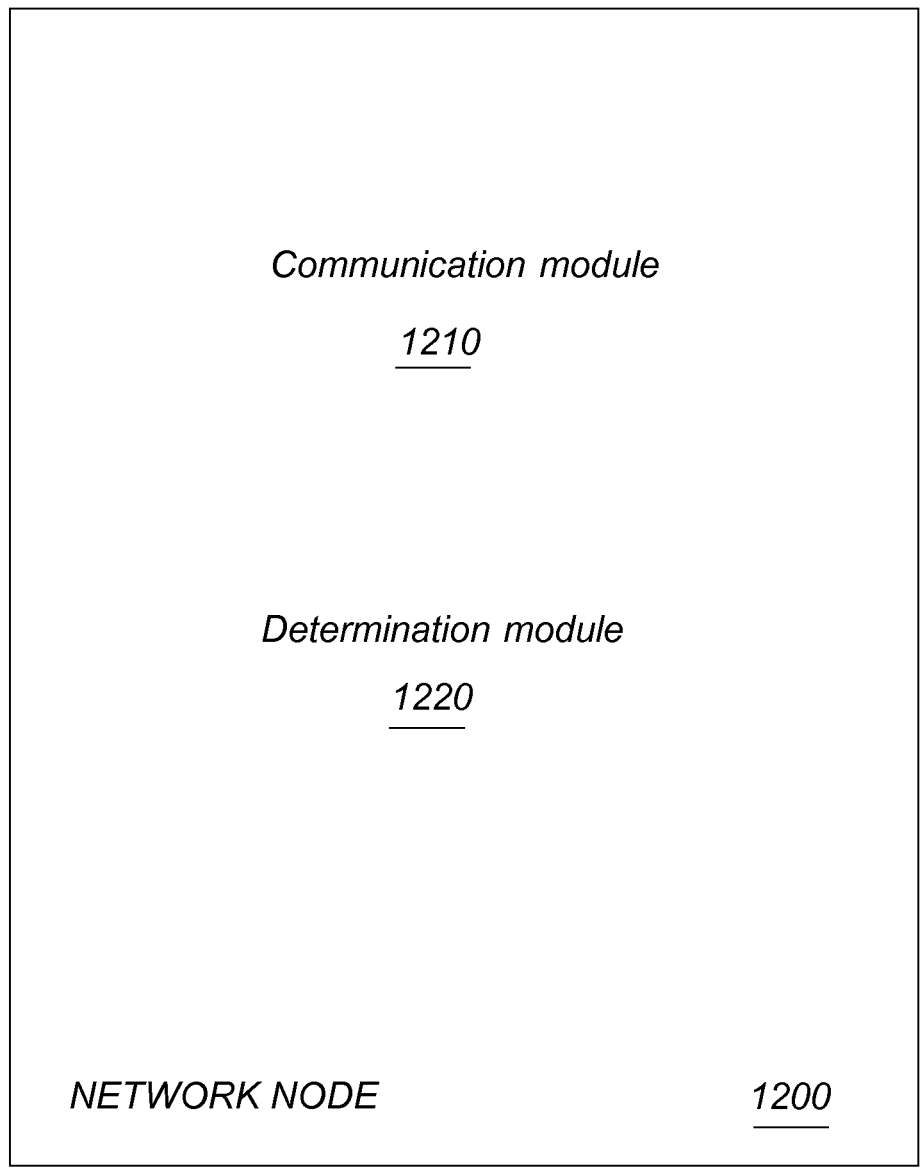
FIG. 12 is a block diagram illustrating example software modules of a computing device network node application useful for implementing the methods described herein, according to one or more embodiments of the present disclosure.

FIG. 12 provides an example network node 1200 wherein the network node comprises a communication module 1210 for transmitting signals to and receiving signals from other network nodes (neighbour nodes) and wireless devices in the communications system. The communication module 1210 may be configured to transmit a first transmission and a second transmission, wherein the second transmission is a beamforming transmission to a served wireless device and the first transmission indicates the presence of the second transmission. The network node further comprises a determination module 1220 for determining the type of transmission. The determination module 1220 may be configured to determine whether coordination or information exchange is supported between the network node 1200 and neighbour nodes. If such exchange of information between neighbour nodes is supported the determining module may be further configured to determine the information to be exchanged. As described in detail above the information may comprise sets of incompatible wireless devices and/or position information of wireless devices. The communication module 1210 may be further configured to exchange said data with neighbour nodes. The determination module 1220 may be further configured to determine whether neighbour node data is known for one or more neighbour node. For example, channel data to enable multi-antenna transmissions directed to the neighbour node and or angular spread information to enable the network node to determine with which neighbour nodes it should communicate. If appropriate neighbour node data is available, the communication module 1210 may be further configured to transmit a beamforming unhiding signal to a neighbour node. The transmission may include encoded information which, in combination with exchanged information, enables neighbour nodes to perform carrier sensing operation in relation to a second beamforming transmission from the network node 1200.

Figure 13:
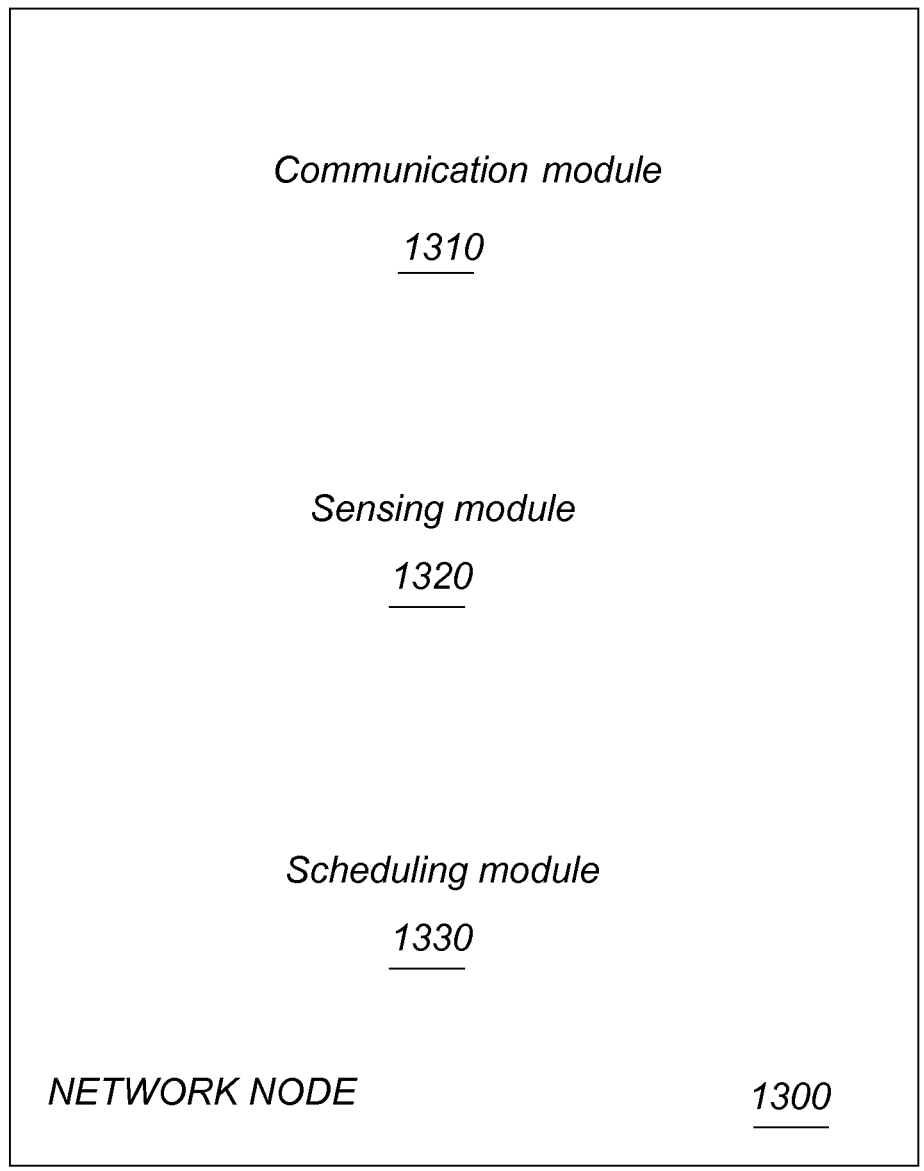
FIG. 13 is a block diagram illustrating example software modules of a neighbour node application useful for implementing the methods described herein, according to one or more embodiments of the present disclosure.

FIG. 13 provides an example neighbour node 1300 wherein the neighbour node 1300 comprises a communication module 1310 for receiving signals from and transmitting signals to other network nodes (neighbour nodes) and wireless devices in the communications system. The communication module 1310 may be configured to receive a first transmission wherein the first transmission indicates the presence of a second transmission. The network node further comprises a sensing module 1320 for performing carrier sensing. The sensing module 1320 may be configured to determine when a carrier is idle based on the received first transmission. The sensing module 1320 may be further configured to determine the start of a second transmission based on the received first transmission. The neighbour node further comprises a scheduling module 1330 for scheduling transmissions to a served wireless device. The scheduling module 1330 may be configured to defer transmissions based on the carrier sensing operation performed by the sensing module 1320.

An aspect provides a computer program for managing a carrier sensing operation, the computer program comprising computer code which, when run on processing circuitry of a network node 1000, or a neighbour node 1100 in a communications system, causes the network node 1000, or the neighbour node 1100 to perform methods as described herein pertaining to the network node 1000 and the neighbour node 1100 respectively.

A further aspect of the disclosure provides a carrier containing a computer program comprising instructions which, when executed on at least one processor, causes the at least one processor to carry out the method according to any example.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An apparatus for managing carrier sensing in a communications network, the apparatus comprising:
 a processor;
 a memory; and
 a communication circuit, the communication circuit being configured to:
  transmit a first transmission;
  transmit a second transmission, the second transmission being a beamforming transmission to a served wireless device and the first transmission is an unhiding signal detectable by one or more neighbour nodes which indicates to the one or more neighbour nodes the presence of the second transmission, the one or more neighbour nodes being required to perform carrier sensing prior to performing a downlink transmission; and
  provide location based information of one or more served wireless devices to the neighbour node, the location based information identifying non-compatible sets of wireless devices, a non-compatible wireless device being a wireless device not served by the neighbour node but which is located within an interference zone of another wireless device served by the neighbour node, the first transmission providing further information related to the served wireless device which receives the second transmission.

2. The apparatus of claim 1, wherein the first transmission comprises information relating to the second transmission to assist the neighbour node perform a carrier sensing operation.

3. The apparatus of claim 1, wherein the location based information is provided by a backhaul network.

4. The apparatus of claim 1, wherein the first transmission comprises information indicating one or more of:
 an identity of a wireless device;
 a position of, or direction from the network node to, a wireless device;
 information about a plurality of wireless devices for a multi-user MIMO transmission;
 a time duration of the second beamforming transmission;
 a frequency of the second beamforming transmission.

5. An apparatus for managing carrier sensing in a communications network, the apparatus comprising:
 a processor;
 a memory; and
 a communication circuit configured to:
  receive a first transmission from a neighbour node;
  perform a carrier sensing operation based on the received first transmission, the first transmission indicating the presence of a second transmission from the neighbour node to a wireless device and served by the network node and wherein the second transmission is a beamforming transmission;
  perform a down-link transmission to a served wireless device, based on the carrier sensing operation; and
  provide location based information of one or more served wireless devices to the neighbour node, the location based information identifying non-compatible sets of wireless devices, a non-compatible wireless device being a wireless device not served by the neighbour node but which is located within an interference zone of another wireless device served by the neighbour node, the first transmission providing further information related to the served wireless device which receives the second transmission.

6. The apparatus of claim 5, wherein the communication circuit is further configured to determine the start of the second transmission based on the start of the first transmission.

7. The apparatus of claim 5, wherein the first transmission comprises information indicating one or more of:
 an identity of a wireless device;
 a position of, or direction from the network node to, a wireless device;
 information about a plurality of wireless devices for a multi-user MIMO transmission;
 a time duration of the second beamforming transmission;
 a frequency of the second beamforming transmission.

8. A method in a network node for managing carrier sensing in a communications network, the communications network comprising a plurality of network nodes, the method comprising:
 transmitting a first transmission;
 transmitting a second transmission, the second transmission being a beamforming transmission to a served wireless device and the first transmission is an unhiding signal detectable by one or more neighbour nodes which indicates to the one or more neighbour nodes the presence of the second transmission, the one or more neighbour nodes being required to perform carrier sensing prior to performing a down-link transmission; and
 providing location based information of one or more served wireless devices to the neighbour node, the first transmission providing further information related to the served wireless device which receives the second transmission, the location based information identifying non-compatible sets of wireless devices, a non-compatible wireless device being a wireless device not served by the neighbour node but which is located within an interference zone of another wireless device, served by the neighbour node.

9. The method of claim 8, wherein the first transmission comprises a sweeping beamforming transmission.

10. The method of claim 8, wherein the first transmission comprises a directional beamforming transmission, directed to a neighbour node.

11. The method of claim 8, wherein the first transmission is concurrent with the second transmission.

12. The method of claim 8, wherein the first transmission comprises information relating to the second transmission to assist the neighbour node perform a carrier sensing operation.

13. The method of claim 8, wherein the location based information is provided by a backhaul network.

14. The method of claim 8, wherein the first transmission comprises information indicating one or more of:
 an identity of a wireless device;
 a position of, or direction from the network node to, a wireless device;
 information about a plurality of wireless devices for a multi-user MIMO transmission;
 a time duration of the second beamforming transmission;
 a frequency of the second beamforming transmission.

15. A method in a network node for managing carrier sensing in a communications network comprising a plurality of network nodes, the method comprising:
 receiving a first transmission from a neighbour node;
 performing a carrier sensing operation based on the received first transmission, wherein the first transmission indicates the presence of a second transmission from the neighbour node to a wireless device not served by the network node, and wherein the second transmission is a beamforming transmission;
 performing a down-link transmission to a served wireless device, based on the carrier sensing operation; and
 providing location based information of one or more served wireless devices to the neighbour node, the location based information identifying non-compatible sets of wireless devices, a non-compatible wireless device being a wireless device not served by the neighbour node but which is located within an interference zone of another wireless device served by the neighbour node, the first transmission providing further information related to the served wireless device which receives the second transmission.

16. The method of claim 15, further comprising determining the start of the second transmission based on the start of the first transmission.

17. The method of claim 15, wherein the first transmission and the second transmission occur concurrently.

18. The method of claim 15, wherein the first transmission comprises information indicating one or more of:
 an identity of a wireless device;
 a position of, or direction from the network node to, a wireless device;
 information about a plurality of wireless devices for a multi-user MIMO transmission;
 a time duration of the second beamforming transmission;
 a frequency of the second beamforming transmission.

* * * * *